Aug. 7, 1956 A. I. BEAN ET AL 2,757,577
FEED CAM TRIP MECHANISM FOR GEAR SHAPERS
Filed April 20, 1953 3 Sheets-Sheet 1

*INVENTORS*
ARTHUR I. BEAN
BY PAUL H. KINGSTON
John Morton
THEIR ATTORNEY

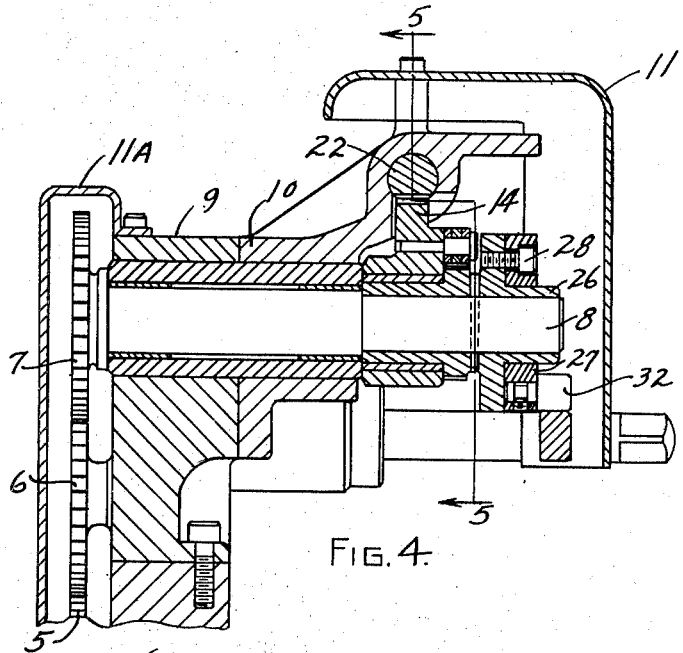
FIG. 4.
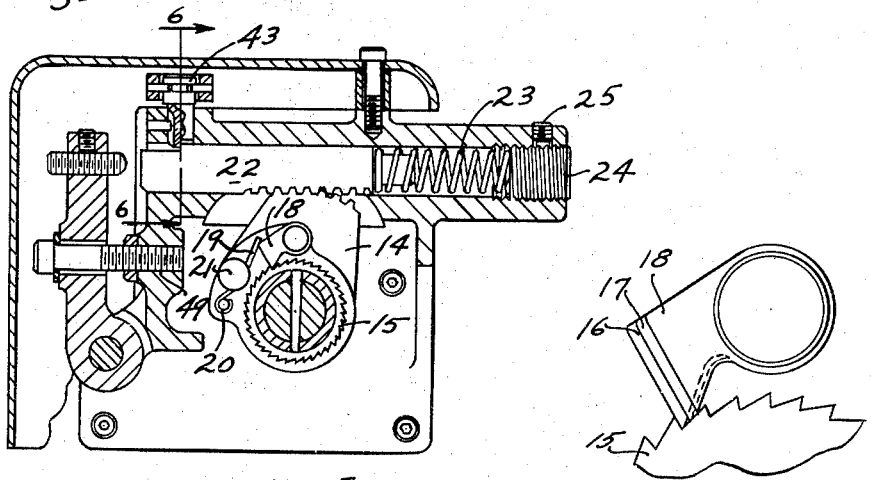
FIG. 5.
FIG. 7.
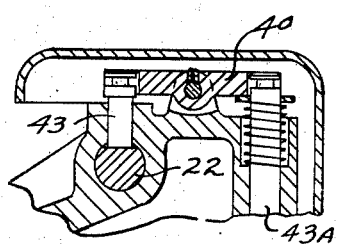
FIG. 6.
*INVENTORS*
ARTHUR I. BEAN
PAUL H. KINGSTON
BY John Morton
THEIR ATTORNEY Aug. 7, 1956  A. I. BEAN ET AL  2,757,577
FEED CAM TRIP MECHANISM FOR GEAR SHAPERS
Filed April 20, 1953  3 Sheets-Sheet 3

INVENTORS
ARTHUR I. BEAN
PAUL H. KINGSTON
BY John Morton
THEIR ATTORNEY.

United States Patent Office 2,757,577
Patented Aug. 7, 1956

2,757,577

FEED CAM TRIP MECHANISM FOR GEAR SHAPERS

Arthur I. Bean and Paul H. Kingston, Springfield, Vt., assignors to The Fellows Gear Shaper Company, Springfield, Vt., a corporation of Vermont Application April 20, 1953, Serial No. 349,848

8 Claims. (Cl. 90—7)

This invention relates to gear finishing machines on which gears or similar objects are to be cut in which a cutter having teeth arranged correspondingly to those of a gear element with cutting edges thereon is given a movement of reciprocation relative to the work piece or vice versa while relative rotational movements of generation are imparted to the cutter and work, similar to those of gears running together in mesh, in such manner that teeth are generated and cut in the work with forms conjugate to the tooth forms or outlines of the cutter. In machines of this type the reciprocating cutter spindle and work spindle are radially fed relative to each other, usually by a depth feed cam. The cutter and work may make one or more rotative movements relative to each other depending upon the shape given to the cam. After the work is finally cut the depth feed cam permits the cutter spindle and work spindle to be fed radially out of contact so that a new work piece can be placed on the work spindle in position for teeth or other conjugate shapes to be formed thereon.

We have found that in order to obtain the most desirable results it is necessary to stop the relative rotation of cutter and work at an exact point on the periphery of the work piece. If this is not done and if the rotative movement of cutter and work continue through too large an overlapping area there will be a hole placed in the periphery of the work so the work is not concentric. Likewise if the cutter and work do not perform a complete rotation of the workpiece relative to the cutter there will be a bump or so called "hump" formed on the work which will similarly produce a portion of the work piece which is eccentric with respect to its rotative center.

The main object of the present invention is to control the amount of rotary overtravel of the cutter with respect to the work piece, and particularly the angular amount of the concentric position of the depth feed cam used prior to the point where the roll or abutment drops into the cam depression to withdraw the cutter from the work.

A second object is to provide a means whereby the relative rotation of the work piece and cutter are positively controlled.

Still another object is to provide a means whereby the amount of relative rotation of cutter and work may be adjusted so as to provide a given amount of overlap or underlap or to secure an accurate and predetermined amount of rotation.

A still further object of the present invention is to provide a device for governing accurately the disengaging point of gear cutter and work piece which is adjustable in accordance with work pieces of different diameters.

More particularly the present invention is an improvement in the type of gear shaper shown in Fellows Patent 1,463,806 issued August 7, 1923 or Miller Patent 2,034,765 issued March 24, 1936. In both of these aforementioned patents the cutter carriage is moved relatively radially of the work to feed the cutter to depth and is withdrawn radially to allow removal of finished work pieces from the machine.

In the drawings:

Figure 4 is a view taken on a line 4—4 of Figure 1 and which is a vertical cross section of the feed cam trip mechanism and shows the gearing which rotates it in unison with the cam shaft.

Figure 5 is a view taken in the direction of the arrows on line 5—5 of Figure 4 and which shows the rack plunger and related mechanism.

Figure 6 is a view of a partial section taken on line 6—6 of Figure 5 which shows the arrangement of locking pin, locking pin lever, and the actuating rod and spring which are mounted in the feed cam trip mechanism bracket.

Figure 7 is a partial view showing the arrangement of the ratchet wheel and ratchet pawls which are employed to obtain varying amounts of movement in the present device.

Like reference characters designate the same parts wherever they occur in all of the figures of the drawings.

Figures 1, 2, 3:
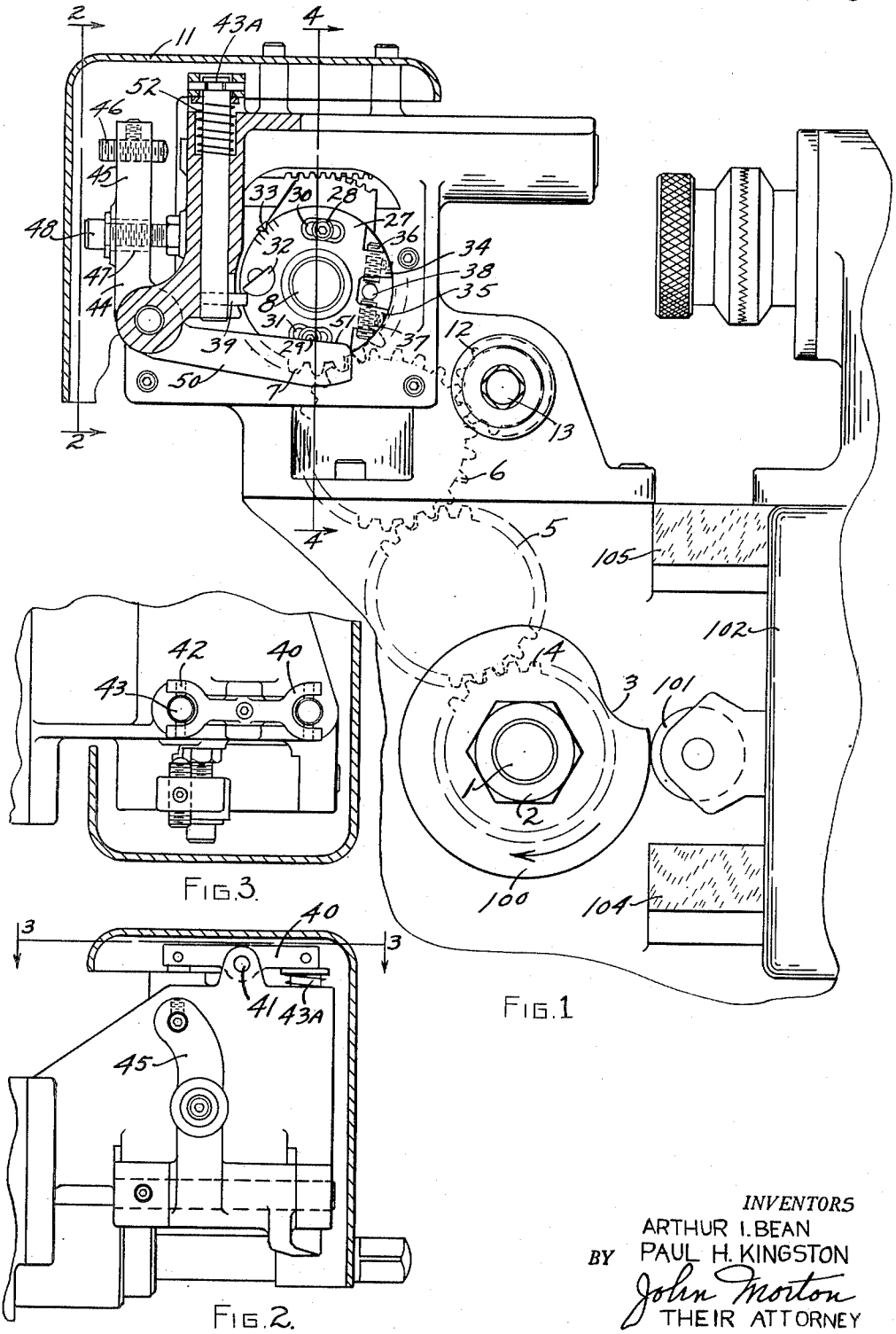
Figure 1 is a front elevation of the present device showing the feed cam trip mechanism and the gearing between it and the throwout cam shaft.
Figure 2 is a vertical end view taken on line 2—2 of Figure 1 showing the feed cam trip mechanism bracket, the reload lever and locking pin lever mounted thereon.
Figure 3 is a plan view taken on line 3—3 of Figure 2 showing the locking pin lever and stop screw mechanism which is mounted on the upper arm of the reload lever.

As shown in the present drawings the cutter carriage is mounted to move radially of the work to feed the cutter to depth and to allow withdrawal of the cutter carriage when it is desired to place a new work piece on the work spindle. The cutter carriage is fed radial of the work by a cam 100 acting on the abutment member 101 of the cutter carriage 102. This cutter carriage 102 is mounted on ways 104 and 105 of the upstanding base of the machine for sliding movement toward and away from the work spindle in a manner well known in the art. The abutment 101 is urged against the depth feed cam 100 by a weight or other suitable means which is also well known in the art. The depth feed cam 100 is driven in the manner referred to in the above mentioned patents to Fellows and Miller. The parts last referred to, which are not shown in these drawings may be identical or similar to these shown in the aforementioned patents. As the present invention involves nothing new in the basic drive of the depth feed cam or with respect to such particulars we have deemed it unnecessary to complicate the present drawings by repeating another illustration of such details herein particularly when such details are well known to anyone skilled in the art.

As shown in Figure 1 the conventional depth feed cam 100 is mounted on a shaft 1 and secured thereto by a nut or other arrangement 2. As is well known in the art this depth feed cam has a rising part which cooperates with the abutment 101 to gradually feed the cutter relative to the work and into the desired depth. If it is considered necessary the cam 100 may have a portion of constant radius thereon so that the work may go through a second or even added complete revolutions relative to the cutter so as to provide any necessary or desired number of finishing cuts. The depression 3 on the cam 100 permits the withdrawal of the cutter relative to the work so as to remove the finished work piece from the cutter spindle and put a new work piece on which teeth or other shapes are to be formed on the work spindle.

As shown in Figure 1 the cam member 100 rotates in a clockwise direction as designated thereon by the arrow. As is well known the outer peripheries of the gear shaper cutter and the work piece rotate relatively to each other in the manner of two intermeshing gear elements. The point where the cutter first engages the blank and forms the first tooth may become the starting point. After the cutter travels far enough relative to the work so that the work blank has performed a complete rotation of 360° the work blank may be finished. However sometimes it is necessary to perform one or more complete rotations of the work piece relative to the blank. After either the first complete rotation or the second or added complete rotations of work relative to blank the cutter must be disengaged from the teeth of the finished work piece and backed away from the teeth thereof. This disengagement is provided for through the medium of the recess 3 in the cam 100. As pointed out above it is frequently necessary to accurately locate this point of disengagement so as to avoid any inaccuracies in the work piece.

Mounted on the shaft 1 is a gear 4 which is keyed to the shaft to rotate therewith. Gear 4 meshes with gear 5 which in turn drives gear 6. This gear 6 meshes and drives a gear 7 which is mounted on a shaft 8 (Fig. 4). Shaft 8 is journaled in a bracket member mounted on the top of the base of the machine. This bracket member for ease in assembly and machining is composed of two parts 9 and 10 which may be secured together in any appropriate manner and which similarly is attached to the top of the base of the machine in any desired manner such as is well known in the art. As shown in Figures 1 and 4 suitable guards 11 and 11A are provided to eliminate any possibility of injury by an operator from the moving parts of the mechanism.

In Figure 1 an idler gear 12 is mounted on a shaft 13 which may be manually rotated. This gear 12 is an idler gear which meshes with the gear 6 of the gear train between the shaft 1 and shaft 8. By turning the shaft 13 in the desired direction the mechanism may be brought to any adjusted position preferred.

As shown in Figures 4 and 5 the shaft 8 through the medium of the interposed ratchet wheel 15 carries a segment gear 14. This ratchet wheel 15 is keyed to the shaft 8 to rotate therewith. As shown in Figure 5 the segment gear 14 is rotatably mounted on the back shoulder of ratchet wheel 15.

Mounted on the segment gear 14 are three ratchet pawls 16, 17 and 18 (Fig. 7). These pawl members are held in contact with the ratchet wheel 15 by a spring 19 which is pinned to the segment gear 14 as shown at 20 (Fig. 5). A pin member 21 holds the spring 19 in engagement with the pawls referred to above. Since the segment gear 14 is free to rotate on the shoulder of ratchet wheel 15 it will be seen that it is capable of movement in a clockwise direction without imparting any movement to the shaft 8. If moved in a counterclockwise direction it will impart movement to the shaft 8 through the pawl members 16, 17 and 18 and the ratchet 15. The three pawl members are provided so as to impart varying degrees of movement to the shaft 8. The use of the multiplicity of pawls permits a very fine and accurate control of the amounts of rotation of the shaft 8 to be obtained.

Mounted in the bracket members 9 and 10 is a rack plunger 22. The rack plunger 22 has gear teeth formed on the lower side thereof which gear teeth mesh with the teeth on the segment gear 14 (Fig. 1 and Fig. 5). The rack plunger is urged to the left as seen in Figure 5 by a spring member 23. This spring member abuts one end of the rack plunger 22 and the other end of the spring member abuts a threaded member 24. Threaded member 24 is held in any desired position by a set screw 25. By adjusting the member 24 it will be seen that the tension of the spring 23 may be varied to control the motion of the rack plunger 22.

On the end of shaft 8 is a plate member 26. As seen in Figure 4 this plate member 26 is pinned to the shaft 8 to rotate therewith. The plate member 26 contains a pin dial 27 which is fixed to the plate member by screws 28 and 29 (Fig. 1). The pin dial member has formed therein elongated slots 30 and 31 in which the screws 28 and 29 are fitted. The use of these elongated slots permits the adjustment of the dial member on the plate member.

Mounted on the pin dial member 27 is a trip pin 32 (Figs. 1 and 4). The pin dial member 27 may be graduated as shown in Figure 1 so that the machine operator can visually determine the amount of adjustment of the pin dial member. A cooperating pointer 33 may be provided on the plate member 26 to show the amount of the adjustment. As shown in Figure 1 the dial member has two spaced arms 34 and 35. Threaded in the spaced arms 34 and 35 are set screws 36 and 37. These set screws 36 and 37 abut a pin member 38 which is fixed to the plate member 26. As will be obvious by advancing one screw 36 and retracting screw 37 or vice versa the pin dial member 27 can be adjusted relative to the plate member 26 upon loosening of the screws 28 and 29.

Also mounted in the bracket member 10 is a lever rod 43A. This lever rod is mounted for slidable movement in the bracket member 10 and at its lower end is a lever rod pin 39. This pin is placed in the path of the trip pin 32 so that upon rotation of the pin dial the member 32 will strike the pin 39 and cause movement of the lever rod 43A. When the lever rod 43A is contacted by the trip pin 32 it will be forced downwardly. The upper end of the lever rod 43A is pinned to locking pin lever 40 (Figs. 3 and 6). Lever 40 is pivotally mounted on a pin member 41. The other end of the lever 40 is pinned as shown at 42 (Fig. 3) to a locking pin 43. As shown in Figure 5 this locking pin holds the rack plunger 22 against movement to the left. When the locking pin 43 is withdrawn from contact with the rack plunger 22 the rack plunger will move to the left under the force of the spring 23 and will impart movement to the segment gear 14.

Pivotally mounted in the bracket 10 is a 2-arm lever 44 (Fig. 1). One arm 45 of this lever contains a set screw 46 which serves as a stop to limit the movement of rack plunger 22. This arm 45 also has an opening 47 therein through which passes loosely a screw 48. This screw 48 has an enlarged head thereon which limits the movement of the lever 44. The inner end of screw 48 is threaded into the bracket members as will be seen at 49 (Fig. 5). The other arm 50 of the lever 44 is arranged so as to provide an abutment surface 51 which lies in the path of the trip pin 32.

The lever 44 may be termed a reload lever and the purpose of the arm 50 thereon is to reload the trip mechanism to place it in position for another rotative movement of the depth feed cam 100.

In operation a work piece is placed on the work spindle of the gear cutting machine and the machine is started. The depth feed cam 100 will rotate in a clockwise direction. Upon rotation of the depth feed cam 100 the shaft member 8 through the gear train between shaft 8 and shaft 1 will be rotated in a counter-clockwise direction. The counter-clockwise movement will be imparted to the plate member 26 and likewise the pin dial 27. The pin 32 will therefore be carried into engagement with the lever rod pin 39. When the pin 32 engages the pin 39 it will force the lever rod 43A downwardly, thereby lifting the stop member 43. When the stop member 43 is lifted the rack element 32 will move rapidly to the left and impart rotary movement to the segment gear 14. This movement of the segment gear 14 will through the medium of the pawl and ratchet mechanism 15, 16, 17 and 18 impart a rapid movement to the shaft 8. This movement is in the nature of a customary overriding clutch arrangement which is shown in the above cited patents and the rapid movement of the shaft 8 will be communicated to the depth feed cam 100 through the gear train 7, 6, 5 and 4. The rapid movement of the depth feed cam will allow the abutment 101 to move rapidly to the left as seen in Figure 1 and so withdraw the cutter and work from contact with each other.

Further movement of the plate member 27 in a counter-clockwise direction will cause the stop 32 to strike the abutment surface 51 on the arm 50 of lever 44. This will cause the lever 44 to rotate in a clockwise direction which will bring the screw 46 into engagement with the rack plunger 22 forcing it to the right as seen in Figure 5. Upon being forced to the right the stop 43 may be placed in locking position. The placing of the stop 43 in locking position is caused by the action of spring 52 which forces the lever rod 43A upwardly and which therefore through the member 40 will force the stop 43 into engagement with the rack element 42.

Figure 9:
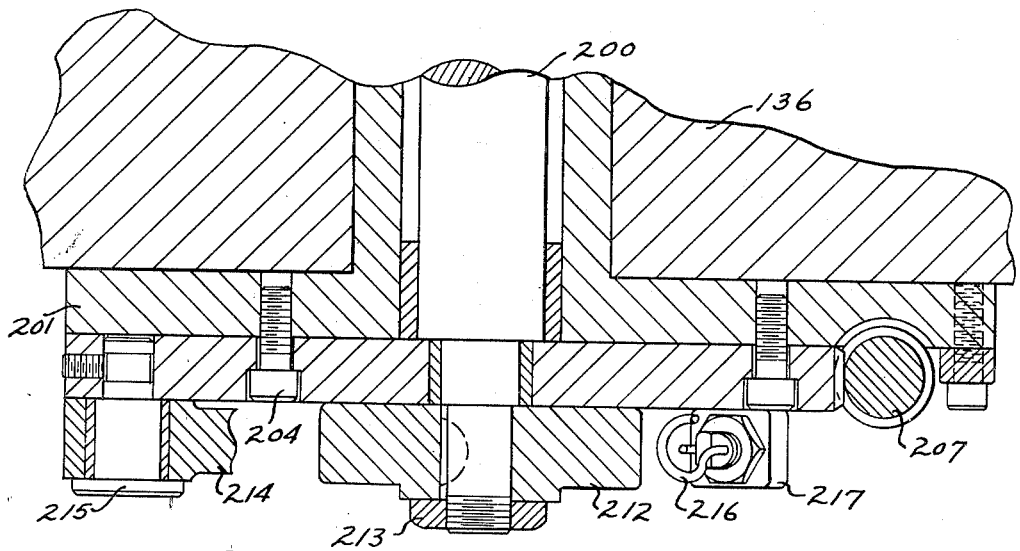
Figure 9 is a plan view taken on lines 9—9 of Figure 8.
Figure 8:
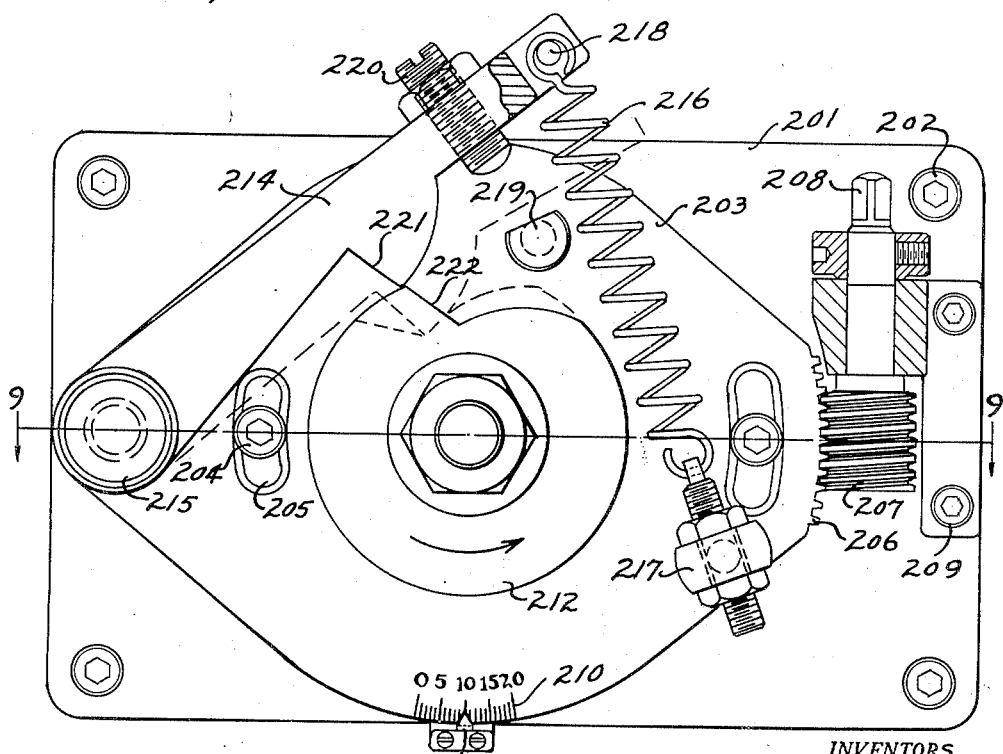
Figure 8 is a front elevation of a device similar to that shown and described in Figures 1 through 7 but which eliminates the gearing between the depth feed cam and the feed cam trip mechanism.

Shown in Figures 8 and 9 is a modification of the device described above.

In the modification shown in Figures 8 and 9 the gearing between the depth feed cam and the feed cam trip mechanism is eliminated.

As shown in Figures 8 and 9 the shaft 200 corresponds, for example, to the shaft 130 of the Miller Patent 2,034,765 mentioned above. To apply the device to the Miller machine it would be necessary to extend the shaft 130 through the frame member 136 so as to allow the device of Figures 8 and 9 to be attached to said frame member. The numeral 136 is used in the present drawings to denote the corresponding member in the above mentioned Miller patent.

To the frame member 136 is attached a combined bearing and plate member 201. This member may be attached to frame member 136 in any suitable manner such as by the bolts 202. Mounted on the member 201 is an adjustable latch holder 203. This adjustable latch holder 203 is mounted on the member 201 and held thereon by screws 204 which fit in elongated slots 205 so as to permit rotation of the latch holder about its axis.

If desired the latch holder 203 may have gear teeth formed on one side thereof such as at 206. These teeth mesh with a worm 207 which is made integral with the shaft 208. This shaft is journaled in a bearing which is in turn fixed to the member 201 by screws 209. After loosening screws 204 rotation of the shaft 208 by a crank or other means will rotate and adjust the latch holder 203. The screws 204 will then be tightened to hold the latch holder 203 accurately in position. If desired, graduations 210 may be placed on the latch holder to cooperate with an indicating mark 211 fixed to the member 201 to show the desired amount of adjustment.

Mounted on the outer end of the shaft 200 is a cam member 212. This cam member is keyed or otherwise fixed to the shaft 200 and held thereon by a nut 213.

Pivotally mounted on the latch holder 203 is an arm 214. This arm is pivoted on a pin 215. The arm 214 is urged downwardly as shown in Figure 8 by a spring 216 which is adjustably attached to the latch holder 203 by any suitable mechanism such as shown at 217. The other end of this spring is fixed to the arm 214 by the pin 218.

A stop member 219 is also fixed to the latch holder 203 and this stop member 219 cooperates with a threaded abutment 220 which is threaded into the latch 214 so as to allow adjustment of the abutment with respect to the latch. The abutment 220 and stop member 219 serve to limit the inward movement of the latch 214.

As shown at 221 the latch member has an inclined surface thereon. This inclined surface cooperates with a complementary inclined surface 222 on the cam member 212.

In operation the cam member 212 turns in a counter-clockwise direction. During the in feed of the cutter and work relative to each other the cam member 212 will rotate at the same speed as the depth feed cam of the machine on which the present mechanism is fixed. When the cam 212 has rotated through an amount necessary to bring the surfaces 221 and 222 adjacent to each other the riding of the surfaces 221 and 222 on each other will accelerate the rotation of the shaft 200. This will in turn permit the abutment on the cutter slide cooperating with the depth feed cam to drop rapidly into the depression on the depth feed cam and accordingly permit the rapid retraction of the cutter relative to the work.

We claim:

1. In a machine of the character described, having a cutter spindle, a work spindle, means, to rotate said spindles in timed relation to each other, and means to reciprocate one of said spindles relative to the other, a means to feed one of said spindles transversely towards and away from the axis of the other spindle, said means including a depth feed cam, means to impart movement to said depth feed cam a secondary movement imparting means arranged to periodically accelerate the rate of movement given to said cam by said first mentioned movement imparting means and means to actuate said secondary movement imparting means in timed relation to the motion of said depth feed cam when retraction of said work spindle and cutter spindle from each other is about to be effected.

2. In a machine of the character described, having a base, a cutter spindle mounted on said base, a work spindle mounted on said base, means to rotate said cutter and work spindles in timed relation to each other, and means to impart a relative reciprocatory movement to one of said spindles with respect to the other, a means to impart a depth feed movement to one of said spindles, said means including a depth feed cam, means to rotate said depth feed cam, a second means arranged to supplement the first mentioned rotating means for said depth feed cam, and means to operate said secondary supplemental means periodically during the rotation of said spindles said last mentioned means being operable when retraction of said spindles from each other is about to be effected.

3. In a gear finishing machine of the character described, having a base, a work spindle mounted for rotative movement in said base, a saddle mounted on said base for movement transverse to said work spindle, a cutter spindle mounted to rotate in said saddle, means to impart said transverse movement to said saddle, means to rotate said cutter spindle and work spindle in timed relation to each other, and means to reciprocate one of said spindles relative to the other, said means for imparting transverse movement to said saddle consisting of a depth feed cam, said depth feed cam being mounted on a rotatable shaft, a primary rotating means for said shaft, a secondary rotating means for said shaft also mounted on said shaft, and means to periodically actuate said secondary rotating means in accordance with a predetermined rotation of said cutter and work spindles when retraction of said work spindle relative to said cutter spindle is to be effected.

4. In a gear shaper of the character described, having a base, a spindle carrying saddle mounted on said base, a spindle rotatably mounted on said saddle, and means for feeding said saddle transversely to the axis of said spindle, said means including a shaft rotatably mounted in said base, a depth feed cam mounted on said shaft, an abutment on said saddle engaging said depth feed cam, means to impart rotation to said depth feed cam shaft, a secondary means for rotating said depth feed cam shaft, and means to actuate said secondary rotating means in timed relation with the rotation of said depth feed cam so as to impart a periodic impulse of added movement to said depth feed cam when said depth feed cam has completed substantially a complete revolution.

5. In a gear shaper, a base, a depth feed cam mounted on a shaft journaled in said base, said depth feed cam being arranged to move a cutter saddle in a transverse direction, means to rotate said depth feed cam, a trip mechanism connected to said depth feed cam to rotate therewith, and means coacting with said trip mechanism to impart an accelerated secondary rotation to said depth feed cam, said means including a spring urged member to actuate said means periodically in accordance with the rotation of said depth feed cam.

6. In a gear finishing machine, a base, a cam shaft journalled in said base, means to rotate said shaft, a depth feed cam fixed to said shaft, a latch plate rotatable on said shaft, a trip cam fixed to said cam shaft, said trip cam having an angularly disposed surface thereon, an arm pivotally mounted on said latch plate, said arm having an angularly disposed surface thereon arranged to engage periodically the similar surface on said trip cam, and means urging said arm into contact with said trip cam, whereby during rotation of said depth feed cam and trip cam said surfaces coact to give a periodic acceleration to said shaft to which said cams are fixed.

7. In a gear finishing machine, a base, a cam shaft journalled in said base, means to rotate said shaft, a depth feed cam fixed to said shaft, a latch plate rotatable on said shaft, a trip cam fixed to said cam shaft, said trip cam having an angularly disposed surface thereon, an arm pivotally mounted on said latch plate, said arm having an angularly disposed surface thereon arranged to engage periodically the similar surface on said trip cam, means urging said arm into contact with said trip cam, whereby during rotation of said depth feed cam and trip cam said surfaces coact to give a periodic acceleration to said shaft to which said cams are fixed, and stop means limiting the movement of said arm.

8. In a gear shaper, a base, a depth feed cam shaft journalled in said base, a depth feed cam fixed to said shaft, a second shaft mounted in said base, gearing between said depth feed cam shaft and said second shaft, a ratchet wheel fixed to said second shaft, a segment gear rotatably mounted on said second shaft, a pawl on said segment gear engaging said ratchet wheel, a rack plunger having teeth thereon engaging teeth on said segment gear, means urging said rack plunger in one direction, stop means restraining said rack plunger against movement in said direction, means to release said stop means periodically so constructed and arranged that said rack plunger will be moved and impart an overriding rotation to said depth feed cam.

References Cited in the file of this patent

UNITED STATES PATENTS

| | | |
|---|---|---|
| 1,385,491 | Porter | July 26, 1921 |
| 1,432,854 | Hanson | Oct. 24, 1922 |
| 1,812,205 | Helin | June 30, 1931 |
| 2,034,765 | Miller | Mar. 24, 1936 |
| 2,535,514 | Owens | Dec. 26, 1950 |